US 11,464,202 B2

(12) United States Patent
Lopez

(10) Patent No.: US 11,464,202 B2
(45) Date of Patent: Oct. 11, 2022

(54) COLLAPSIBLE BACKPACK PET TRAILER

(71) Applicant: Cesar Lopez, Astoria, NY (US)

(72) Inventor: Cesar Lopez, Astoria, NY (US)

(73) Assignee: Get Waggin Inc., New Castle, DE (US)

(*) Notice: Subject to any disclaimer, the term of this patent is extended or adjusted under 35 U.S.C. 154(b) by 0 days.

(21) Appl. No.: 17/482,293

(22) Filed: Sep. 22, 2021

(65) Prior Publication Data

US 2022/0087212 A1 Mar. 24, 2022

Related U.S. Application Data

(60) Provisional application No. 63/082,191, filed on Sep. 23, 2020.

(51) Int. Cl.

| | |
|---|---|
| *A01K 1/02* | (2006.01) |
| *B62K 27/00* | (2006.01) |
| *A45C 9/00* | (2006.01) |
| *A45F 4/02* | (2006.01) |
| *B62K 27/02* | (2006.01) |
| *B62K 27/12* | (2006.01) |

(52) U.S. Cl.
CPC ............ *A01K 1/0281* (2013.01); *A01K 1/029* (2013.01); *B62K 27/003* (2013.01); *A45C 9/00* (2013.01); *A45F 4/02* (2013.01); *B62K 27/02* (2013.01); *B62K 27/12* (2013.01)

(58) Field of Classification Search
CPC ......... A01K 1/0281; A01K 1/029; A45F 4/04; A45F 4/00; A45F 2004/026; B62K 27/12; B62K 27/02; B62K 27/003; B62B 2202/42
See application file for complete search history.

(56) References Cited

U.S. PATENT DOCUMENTS

| 1,017,983 A | * | 2/1912 | Long | ............................... 280/37 |
| 2,879,072 A | * | 3/1959 | Rear | ..................... B62D 63/061 |
| | | | | 296/181.7 |

(Continued)

FOREIGN PATENT DOCUMENTS

| GB | 2496927 A | * | 5/2013 | ........... A45C 13/262 |
| WO | WO-2008090296 A1 | * | 7/2008 | ............... A45F 4/06 |

OTHER PUBLICATIONS

Burley Tail Wagon Dog Bike Trailer: https://www.backcountry.com/burley-tail-wagon-trailer (Year: 2017).*

(Continued)

*Primary Examiner* — Timothy D Collins
*Assistant Examiner* — Brittany Lowery
(74) *Attorney, Agent, or Firm* — Cynthia S. Lamon; Lamon Patent Services

(57) ABSTRACT

A trailer apparatus is provided having two half forms connected to a frame joint, the half forms mounted on a first and second pivot bar on the joint frame to pivot to open and to pivot to close in a clam shell arrangement. The trailer apparatus may assume a form of backpack or luggage piece adapted to store items and may assume the form of a towable trailer, having a tow bar, wheels, and a three-dimensional covering over the open sides of the half forms to enclose cargo space or to keep a pet inside the footprint of the half form adapted as trailer bed when the trailer apparatus is extended for use.

18 Claims, 9 Drawing Sheets

(56) References Cited

U.S. PATENT DOCUMENTS

| | | | |
|---|---|---|---|
| 5,020,814 A | | 6/1991 | George et al. |
| 5,460,307 A | * | 10/1995 | Stevenson ................ A45F 4/02 |
| | | | 280/30 |
| 5,785,333 A | * | 7/1998 | Hinkston ............... B62K 27/16 |
| | | | 280/647 |
| 5,979,921 A | * | 11/1999 | Derven ............... B62K 15/006 |
| | | | 280/491.1 |
| 6,062,446 A | * | 5/2000 | Daneau ................... A45F 4/06 |
| | | | 224/156 |
| 6,766,769 B1 | * | 7/2004 | Doyle ................... B62K 27/04 |
| | | | 280/204 |
| 6,896,275 B1 | | 5/2005 | Liu |
| 6,916,028 B2 | * | 7/2005 | Shapiro .................... B62B 7/10 |
| | | | 280/651 |
| 7,445,222 B2 | * | 11/2008 | Bell ...................... B62K 27/02 |
| | | | 280/204 |
| 7,823,906 B2 | * | 11/2010 | Darling, III ......... A61G 1/0225 |
| | | | 280/651 |
| 8,091,908 B2 | * | 1/2012 | Wilson ................. B62K 27/12 |
| | | | 280/204 |
| 8,123,241 B1 | * | 2/2012 | Chen .................. B62K 27/003 |
| | | | 280/204 |
| 8,419,035 B2 | | 4/2013 | Wilson et al. |
| 8,444,173 B1 | | 5/2013 | Liu |
| 8,714,111 B2 | * | 5/2014 | Bryson ............... A01K 1/0245 |
| | | | 119/482 |
| 9,187,109 B2 | * | 11/2015 | Treadwell ................ B62B 3/02 |
| 10,517,265 B2 | * | 12/2019 | Lin .......................... B62B 3/02 |
| 2003/0127835 A1 | * | 7/2003 | Shapiro .................. B62B 3/007 |
| | | | 280/656 |
| 2011/0186396 A1 | * | 8/2011 | Sheikh .................... A45C 5/03 |
| | | | 190/111 |
| 2013/0014794 A1 | * | 1/2013 | Jin ........................ E04H 15/46 |
| | | | 24/595.1 |
| 2013/0249176 A1 | * | 9/2013 | Bengtzen ........... B65D 21/0234 |
| | | | 280/30 |
| 2014/0131963 A1 | * | 5/2014 | Bengtzen ................ A45B 23/00 |
| | | | 280/32 |
| 2016/0017631 A1 | * | 1/2016 | Gilmore ................ E04H 15/324 |
| | | | 135/143 |
| 2020/0189684 A1 | * | 6/2020 | Engel ..................... B62K 27/02 |
| 2020/0383458 A1 | * | 12/2020 | Kersting ................... A45F 4/12 |

OTHER PUBLICATIONS

Schwinn Rascal Bike Pet Trailer; https://www.walmart.com/ip/Schwinn-Rascal-Bike-Pet-Trailer-Orange/55079725 (Year: 2017).*
Aosom Wanderer Folding Bicycle Storage Cart Cargo and Luggage Trailer with Hitch, https://www.aosom.com/item/asom-wanderer-folding-bicyde-storage-cart-cargo-and-luggage-trailer-with-hitch~B4-0008.html?utm_source=google_shopping&utm_medium=cpc&gclid=Cj0KCQiAx9mABhD0ARIsAEfpavQPklhKgmHAEFPi0mo4UeVqV_x961f8QgyAqMZv-2bsNgG3n-kBaZoaAqO1EALw_wcB.
Costway, Bike Trailer with Folding Frame and Quick Release Wheels, https://www.costway.com/bike-trailer-with-folding-frame-and-quick-release-wheels.html?fee=4&fep=15234&utm_source=google&utm_medium=cpc&utm_campaign=product&gclid-Cj0KCQiAx9mABhD0ARIsAEfpavQ37xam4wCYEhB5yMgvBoEnRm-ib0AkO_qJdl48fzjCn274tr7WiBYaAuBjEALw_wCB.
Trixie Premium Quick Fold Dog Bike Trailer, https://www.chewy.com/trixie-premium-quick-fold-dog-bike/dp/248298?utm_source=google-product&utm_medium=cpc&utm_campaign=hg&utm_content=Trixie&utm_term=&gclid=Cj0KCQiAx9mABhD0ARIsAEfpavSmWHJ-XK_781ruq3_J_IFWwLExWcw3QOHQ8GktqqcFVvoqgAhdnoEaAtVBEALw_wcB.
Hamadryad, Off Road Hiking Cart, http://www.hamadryad.be/offroad-hiking-cart.html?epik=dj0yJnU9NmNkWC11Q2ZTZEhmUm1JamFWUzFSeU0xLVk0T09MbVQmcD0wJm49dURrWU8tQ0RieWFDRUczMFZTLTdnUSZ0PUFBQUFBR0FYbXRn.
Travoy, Compact Folding Cargo Bike Trailer, https://www.amazon.com/Travoy-Compact-Folding-Cargo-Trailer/dp/8083XFXKRZ.
Hipstar, https://hipstar.net/features/.

* cited by examiner

COLLAPSIBLE BACKPACK PET TRAILER

CROSS-REFERENCE TO RELATED DOCUMENTS

The present invention claims priority to a U.S. provisional patent application having Ser. No. 63/082,191 entitled COLLAPSIBLE PET TRAILER, filed on Sep. 23, 2021, disclosure of which is included herein at least be reference.

BACKGROUND OF THE INVENTION

1. Field of the Invention

The present invention is in the field of towed vehicular apparatus, including trailers and accessories and pertains particularly to methods and apparatuses for provision of a collapsible animal, child or cargo trailer that may be worn or carried.

2. Discussion of the State of the Art

Vehicle operators including motorcycle riders, and bicycle riders, and operators of other motorized or pedaled vehicles often take their pets like dogs, cats, or other cargo along with them during operation of the vehicle. In some instances, with bicycle riders for example, pets are leashed and may run alongside a cyclist. Problems may occur if a dog with a leash around its neck and running alongside a cyclist runs across the front of the bike's path. Injuries are possible if the leash becomes entangled with the moving parts of the bike, like pedals, sprockets or wheel spokes. In some cases, motorized vehicles that may be operated cannot safely contain pets on board.

A bike rider may in some cases attach a trailer to the rear of the vehicle (bike, motorbike, golf cart) and place pets or cargo in the trailer to overcome the danger of carrying them on the bike or having them run alongside. One drawback with this approach may be that the bike with the trailer cannot be easily parked due to regulations or for safety reasons and the biker needs to take the trailer along. The trailer may also be subject to theft if it must be locked up with the bicycle, such as if the rider must leave the bike at any point with pets, children or cargo. Therefore, what is clearly needed is a collapsible pet and or cargo trailer that may be made portable for carrying.

BRIEF SUMMARY OF THE INVENTION

According to an embodiment of the present invention, a trailer apparatus is provided and includes a first half form adapted as a trailer bed having a floor and a solid frame perimeter defining an internal volume. The first half form may be open on one side, a second half form having a floor and a solid frame perimeter defining an internal volume; the second half form open on one side, a frame joint having a first pivot bar and a second pivot bar, the pivot bars held spaced apart and fixed in parallel relationship by framing elements. In this embodiment, the first half form is mounted to pivot at one end over the first pivot bar, the second half form mounted to pivot at a like end over the second pivot bar on the frame joint producing a clam shell arrangement between the first and second half forms, a first pair of locking mechanisms for locking the half forms in a closed and parallel position with the open sides of the half forms facing each other doubling the internal volume defined within each half form for use as a secure storage apparatus for storing items within at least the internal volume of both half forms in closed position, a telescopic support frame having a base tubular portion and a telescopic portion thereof positioned within the tubular base portion, the telescopic portion thereof culminating at a pullout handle, the telescopic support frame positioned between the first and second half forms and connected to the first half form solid frame at one side and the second half form solid frame at the other side by a pair of sliding frame lock mechanisms, a pair of trailer wheels bracketed and mounted to pivot over a pair of wheel rods, the wheel rods mounted at one end to the frame joint on each side of the frame joint, the wheel rods spaced apart and held parallel at each side of the solid frame perimeter of the first half form, the wheels collapsible into recesses in the floor of the first half form, and a telescopic tow bar having a base tubular member and a telescopic tubular member set within the base tubular member, the tow bar mounted to pivot out from a recessed position in the floor of the second half form and be telescoped out further in length to connect the trailer apparatus to a vehicle.

In one embodiment, the half forms are locked closed to form a wearable backpack. In another embodiment, the half forms are locked closed to form a piece of hand carried luggage. In both of these embodiments, half forms are locked open to form a towed trailer. In one embodiment, the trailer apparatus further includes a tent structure attached at the base thereof to the open sides of the half forms, the tent structure is held taut by the telescopic support frame. In one embodiment, the trailer apparatus further includes an external pocket form removably attached to the floor of the first half form over the wheel recesses, the external pocket form provides additional volume for storing items in the closed form of the trailer apparatus. In one embodiment, the trailer apparatus further includes material to cover a natural gap created between the open sides of the first and second half forms when in a closed position.

In one embodiment, the pair of trailer wheels may be pivoted out from the recesses and be locked in position for towing the trailer on the wheels. In an embodiment with an external pocket form, the external pocket form may be removed by unzipping the form from the external surface of the first half form. In one embodiment, the pair of sliding lock mechanisms on the support frame locks the support frame and the first and second half forms into an open state for trailer use. In one embodiment, the towing vehicle is a bicycle. In another embodiment, the towing vehicle is a vehicle with at least a three wheels.

In one embodiment with a tent structure, the tent structure includes at least one pocket on an inside wall for stowing a laptop, thin electronic device, and office papers. In this embodiment, the tent structure includes tent flaps, windows, and at least one closeable tent opening for loading and unloading pets, children and cargo. In one embodiment of the present invention, the trailer apparatus is closed in the form of a wheeled piece of luggage. In a preferred embodiment, the floors of the first and second half forms are padded with a stiff moldable material. In one embodiment with a tent structure, the tent structure remains connected to the half forms in closed position serving as a canvas liner on the inside of the closed form of the trailer apparatus and pops out as a three-dimensional tent structure when the trailer apparatus is opened and locked into trailer form. In one embodiment, the solid frame perimeter of each half form includes extruded aluminum tubular frame members at each side held parallel and spaced apart by molded polymer-based material end caps that serve as protective bumpers, isolate frame components from the internal volume space of the half forms and serve as mounting support for electronics—like safety lights and safety reflectors. In a preferred embodiment, the telescopic support frame and telescopic tow bar are fabricated of a lightweight material like aluminum. In one embodiment, the tow bar is connected to a swivel hitch provided on the rear center portion of the vehicle.

BRIEF DESCRIPTION OF THE OF THE DRAWINGS

Figure 1:
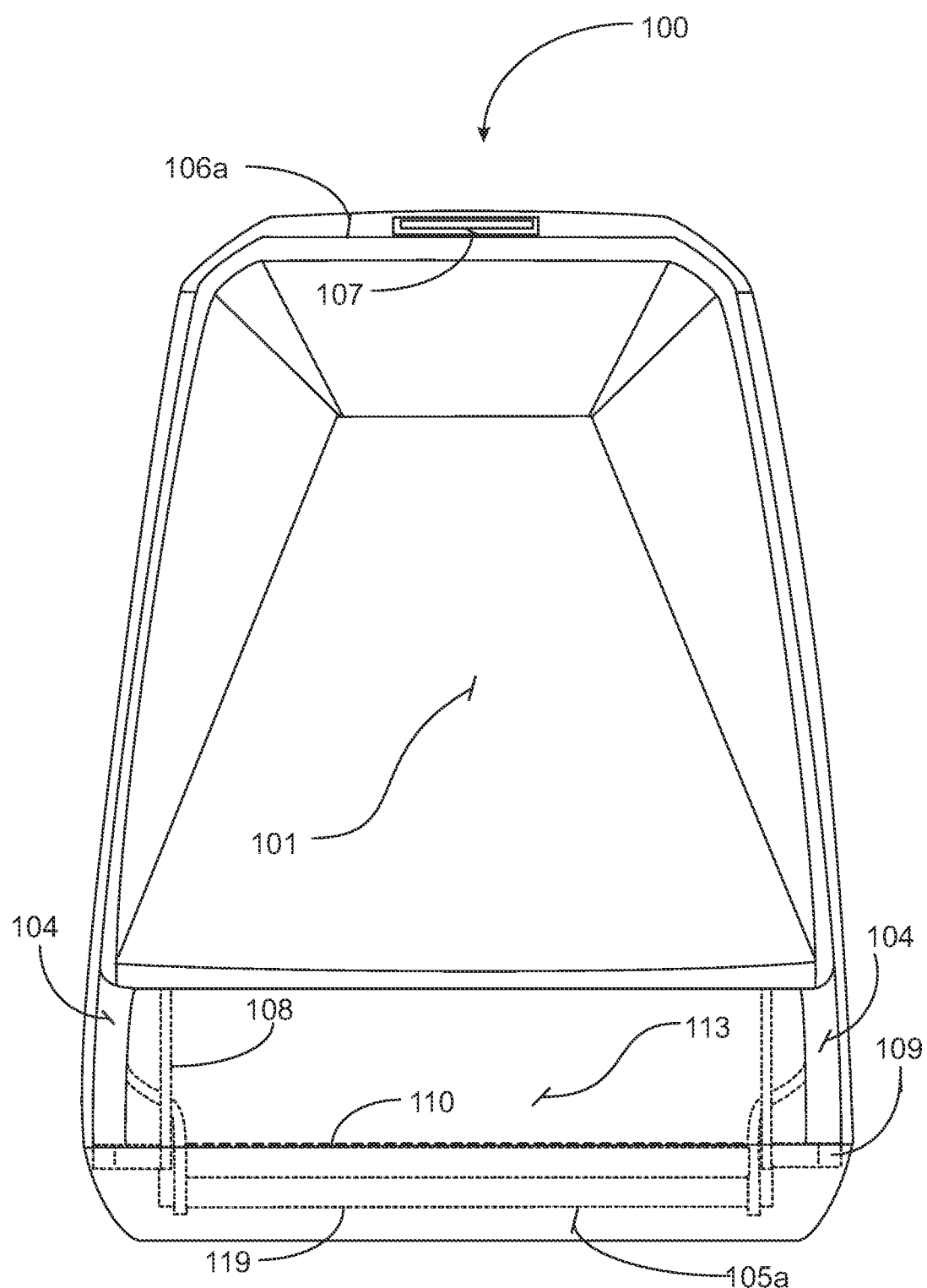
FIG. 1 is a rear elevation view of a collapsible trailer in the form of a wearable backpack according to an embodiment of the present invention.
Figure 8:
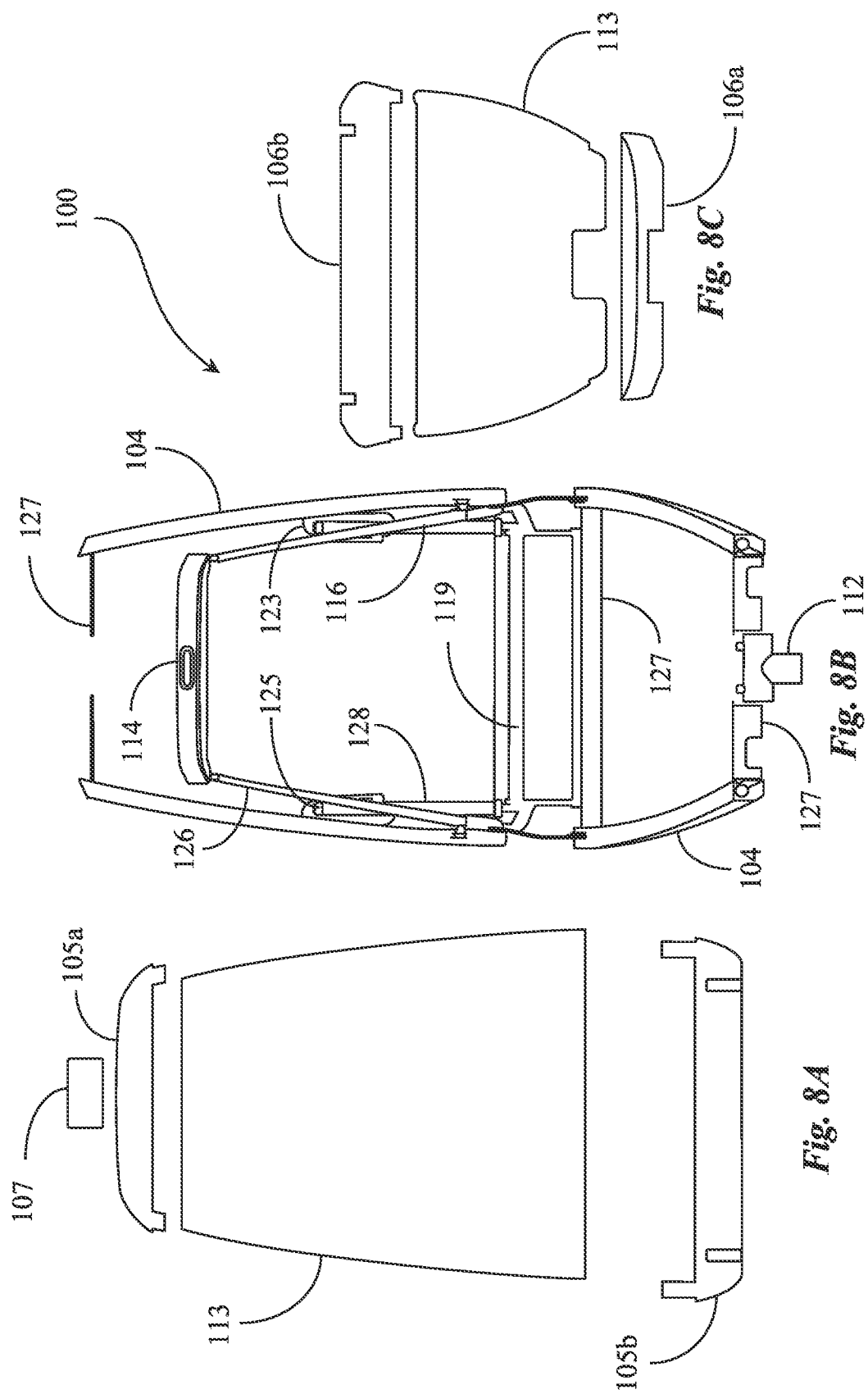

FIG. 8ABC is an overhead exploded view of the basic components of the collapsible trailer of FIG. 1 expanded for use.

Figure 9:
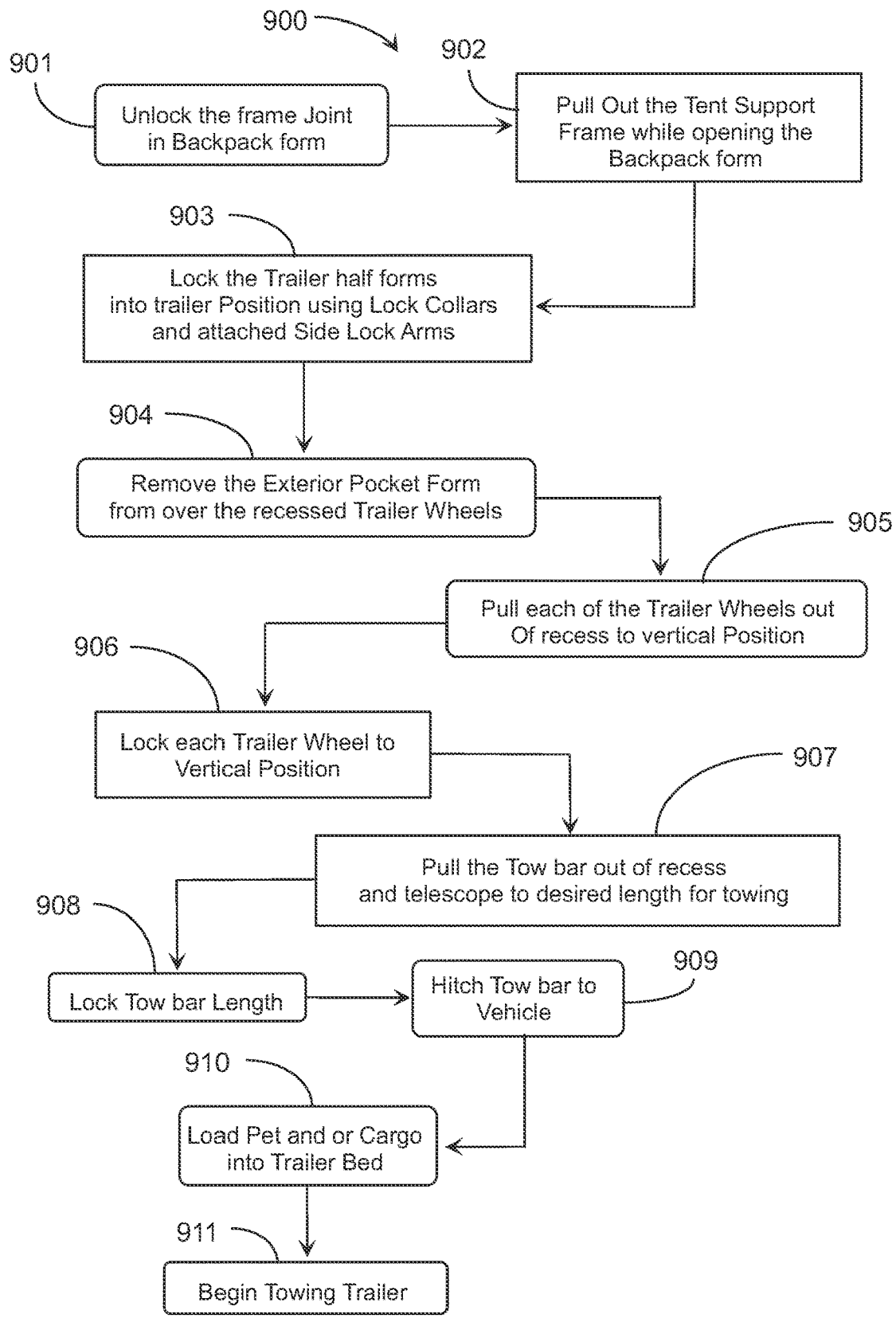

FIG. 9 is a process flow chart depicting steps for expanding the trailer apparatus from a backpack form into a trailer form.

DETAILED DESCRIPTION OF THE INVENTION

In various embodiments described in enabling detail herein, the inventor provides a unique portable and collapsible trailer that may be worn or carried in collapsible form and may be expanded for use as a pet, child, or cargo trailer that may be towed behind a motorized or pedaled vehicle. A goal of the invention is to provide an apparatus that can be worn as a backpack or carried as a piece of luggage and used when needed as a trailer that hauls pets, children, or cargo. Another goal of the invention is to provide a method for converting a trailer from a folded pack or luggage configuration to an operable trailer form that may be used to transport pets, children, and or cargo and that be conveniently collapsed after use into a portable wearable or carry form. The present invention is described using the following examples, which may describe more than one relevant embodiment falling within the scope of the invention.

FIG. 1 is a rear elevation view of collapsible trailer 100 in the form of a wearable backpack according to an embodiment of the present invention. Trailer 100 may be designed to be operated as a wearable backpack in one embodiment of the present invention. In another embodiment, trailer 100 may be designed to be operated as a piece of hand-carry luggage or as a briefcase. Therefore, the particular design of trailer 100 is not limited to backpack or to a piece of portable luggage. An object of the invention is to provide a towable trailer that may be configured into a portable apparatus that may provide internal volume for an operator to use as storage space. Trailer 100 in a closed state provides an internal volume that a user may access, and store items intended to be carried by the user. In this embodiment, trailer 100 is in a closed state and may include a first and second half shell form that may be connected together at the bottom end by a frame joint 119, that may function as a pivot point for opening and closing the trailer in the process of expanding the trailer from the backpack form for use as a towable trailer with wheels and in the process of collapsing the trailer back into a backpack form or into a form of another portable storage apparatus like a piece of luggage or a briefcase.

Trailer 100 is depicted in this view from an elevated perspective, behind a user wearing it as a backpack. The outside half form of this backpack design functions as the horizontal bed of trailer 100 when it is expanded from backpack form. Frame joint 119 may be a rectangular form including two parallel pivot bars (one visible) that individually support one half form. Each half form includes a pair of arcuate tubular frame members 104 (one pair visible) that define the edges of the half forms and that may be mounted to the horizontal pivot bars of frame joint 119, such that each half form may pivot about the bars of the frame joint. In one embodiment, frame members 104 are made of a lightweight but durable material like aluminum or a polymer-based composite that is durable and holds form.

Frame members 104 may be rectangular tubing or annular tubing frame members extruded to form without departing from the spirit and scope of the present invention. Frame members 104 may be formed to an arcuate linear form by a material form-bending process (aluminum) or by heating and bending the material to form (polymer composite) or an extrusion process. Frame joint 119 may be manufactured of lightweight steel or aluminum. Tubular frame members 104 (four total) are connected as pairs such as by bolting them over the pivot arms provided on frame joint 119 (broken boundary) such that one set of frame members symmetrically opposes the other set of frame members in parallel (when closed), supporting each half form of the backpack form.

Trailer 100 includes materially solid end caps that form the outside ends, and the interfacing ends of the half forms of the backpack design. End cap 106a bridges the top side of frame members 104 and is fitted or otherwise attached to the pair of frame members 104. End cap 105a bridges the bottom side of frame members 104 and is fitted to or otherwise attached to the frame members. End caps 106a and 105b may be molded polymer-based caps that serve as rigid bumpers for the expanded trailer form. In this embodiment, end cap 106a may include a material opening provided for accepting installation of a light emitting diode (LED) panel 107. LED panel 107 is adapted to provide illumination at the rear of trailer 100 when it is expanded for use. In a preferred embodiment, LED panel 107 includes a rechargeable battery or batteries and at least one LED. In one embodiment LED panel 107 may include replaceable, non-chargeable batteries. In a preferred embodiment, LED panel 107 may be switched on or off by a user. LED panel 107 may provide a safety mechanism such as if the trailer is towed behind a bicycle at night. There may be more than one LED panel provided on trailer 100 without departing from the spirit and scope of the present invention. Likewise, hard reflectors or reflector tapes may be provided and installed to strategic portions of the perimeter of the trailer and on both half forms without departing from the spirit and scope of the present invention.

Trailer 100 includes a backpack outside pocket 101 adapted to be removable from the backpack form. Pocket 101 is adapted to provide additional internal volume for storing items in the backpack form outside of the internal space between the half forms of the pack design. Pocket 101 may be cut from a durable material like a canvas material or similar stiff but pliable material. In one embodiment, pocket 101 may be attached to the backpack form or trailer 100 using a perimeter zipper, an array of snap interfaces, or a hook and loop interface. In one embodiment, pocket 101 includes one or more openings, thereon enabling user access to an internal volume inside the pocket. An opening may be a zippered opening, a flap opening with a hook and loop interface, or a flap opening secured closed by hook and loop interface. In one embodiment of the present invention, external pocket 101 may be fabricated of a rigid or semi-rigid polymer-based material that is resilient to hold form as a fine mesh outer shell material. In one embodiment, pocket 101 is removed from the backpack form when setting up for a trailer and may be reattached over a tent structure to shield cargo, pets, or children from rain.

Although not illustrated in this example, trailer 100 includes a pair of frame-supported wheels that may be positioned out from the outer surface wall of the half form that doubles as the trailer bed and collapsed back into material recesses or depressions on the surface beneath external pocket 101. External pocket 101 may be adapted to hide the collapsed wheels from view when the backpack form is being worn by a user for aesthetic purposes while providing additional internal volume for storing items. Wheels may be locked into folded or extended position via a pair of wheel lock arms, 108. Wheel lock arms 108 may be fabricated of sheet metal steel and may be connected to frame joint 119. More detail about the wheels of trailer 100 is provided later in this specification.

Trailer 100 includes a stiff backpack material, 113, that may include padding and is adapted as a liner to form the floor of the trailer bed. External pocket 101 may, in one embodiment, extend down to end cap 105a hiding material 113. Material 113 may be a stiff resilient padding material containing microfiber and or cotton fiber; for example, a polymer sheet with padding material glued thereon or otherwise attached there over may be provided. Material 113 may be a standalone material that is stiff enough to adequately support the weight of a pet and of cargo that may be towed in trailer 100 behind a vehicle like a bicycle, golf cart, all-terrain vehicle, or other motorized or mechanically pedaled vehicle. In one embodiment taut canvas trampoline material such as a polypropylene material may be provided and secured to the frame and be stiff enough material to form the floor of the trailer bed and the floor of the vehicle-facing half form.

Padded material 113 may line the bottom and sides of each half form. In one embodiment, the half forms may be molded polymer forms lined with padding material 113. In another embodiment, material 113 may be stiff enough to form the half forms and may be used as a standalone material to form the floor and perimeter wall of each half form. In this view, a filler piece, 110, may be provided in the form of a rectangular piece of sheet metal to prevent cargo stored within the backpack form from falling into the internal space of end caps such as end caps 106a and 105a; preventing stored items from interfering with frame mechanics and the like. In one embodiment, a pad locking system 109 (both sides) is provided to enable locking the backpack form of trailer 100 closed and to unlock the form to open the form into a trailer or to access internally placed items from the internal space. In one embodiment padlock system 109 is similar to the locking mechanism common in a brief case having a tumbler at opposite ends of the handle using number or symbol-marked tumblers.

Figure 2:
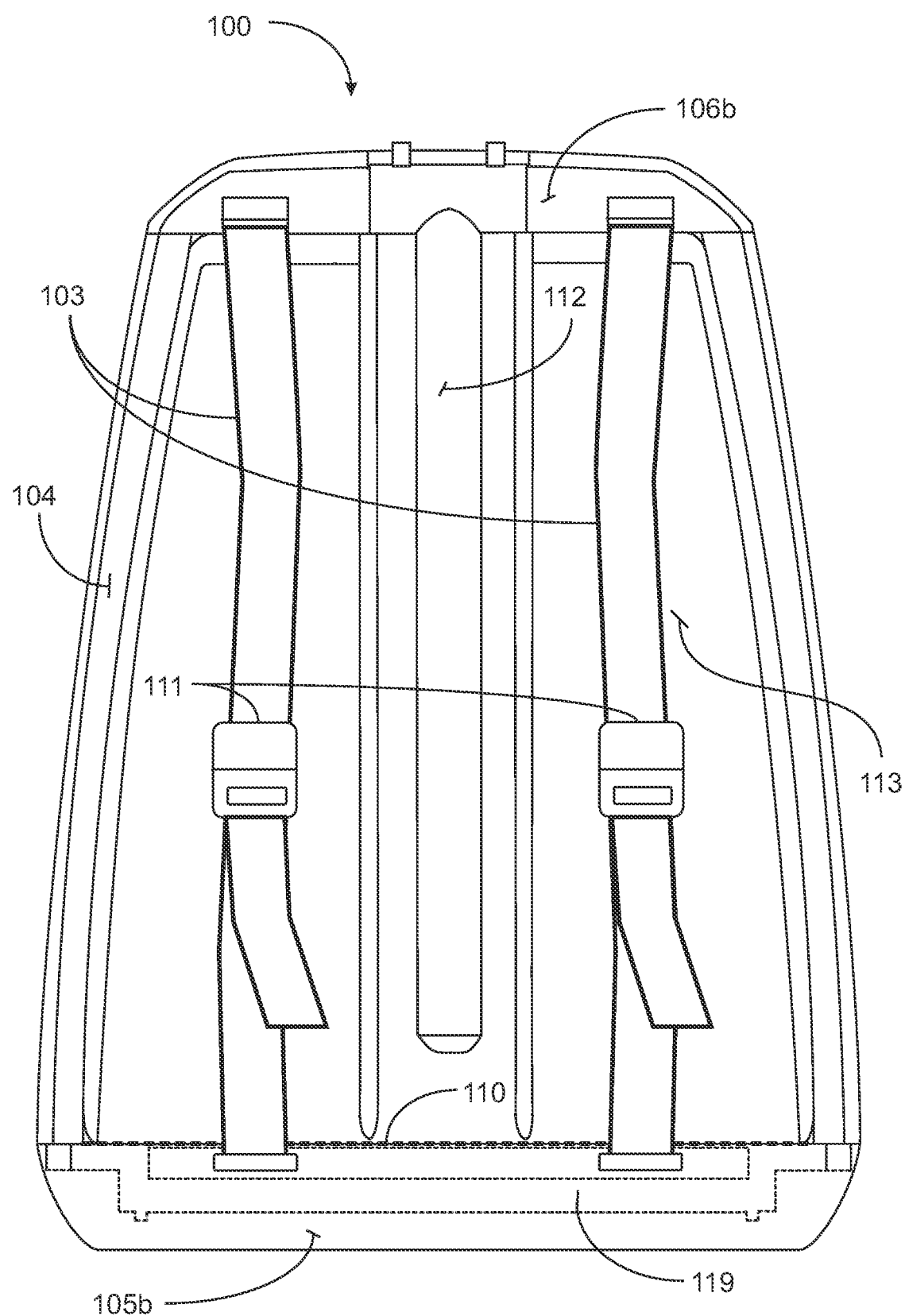
FIG. 2 is a front elevation view of the collapsible trailer of FIG. 1.

FIG. 2 is a front elevation view of collapsible trailer 100 of FIG. 1. Trailer 100 includes a telescopic tow bar 112 that may be adapted to remain recessed into backpack padding material 113 and to pivot out via an orthogonal and tubular base adapted to function as a pivot point for the telescopic tow bar. Telescopic tow bar 112 may be fabricated of steel tubing that may be annular tubing or rectangular tubing and may include hardware for locking or unlocking the tubes for the purpose of adjusting and then locking the telescopic length of the tow bar. Tow bar 112 may be connected to an installation interface on a bicycle seat post or other vehicle framing components or installations and serves as a telescopic, collapsible tow bar for towing trailer 100. In one embodiment, the tow bar 112 may be attached to a harness or vest worn by the vehicle operator. In one embodiment, tow bar 112 may be fabricated from aluminum or another lightweight metal. A recessive form may be provided in padding of material 113 at center and vertical of the backpack form to store the tow bar when the trailer is in backpack form.

On this side of the backpack form, end cap 106b has a portion of material removed to allow tow bar 112 to be pulled out of collapsed position and extended and locked at a desired length for towing trailer 100 behind a bicycle or other vehicle. In a preferred embodiment, tow bar 112 is a straight telescopic part having an outer tube and an inner tube that is not visible in this view but detailed further below. When collapsed into the linear recess provided in the material 113 for the purpose of recessing the tubular structure, the overall length of tow bar 112 is less than the vertical length of the backpack form. End cap 105b encloses the other side of frame joint 119. A second filler piece 110 is similarly provided to segregate the volume inside of end cap 105b from the internal volume of the half forms, ensuring no items come into contact with the frame component or other mechanisms. In this embodiment, backpack straps 103 may be provided to attach to the closed form at each side so trailer 100 may be worn as a normal backpack. Backpack straps 103 are connectable via strap clips 111.

Figure 3:
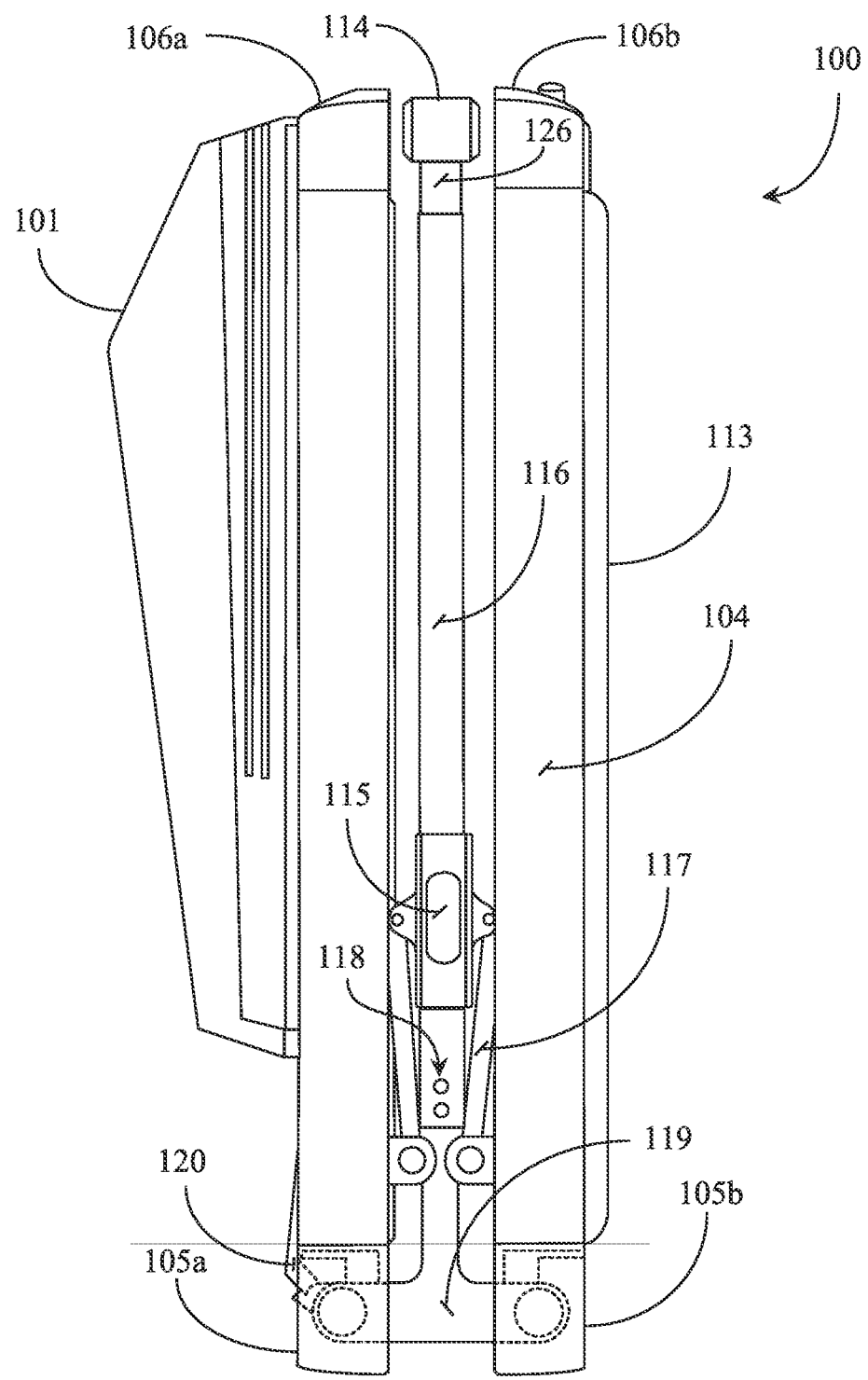
FIG. 3 is a right-side view of the collapsible trailer of FIG. 1.

FIG. 3 is a right-side view of collapsible trailer 100 of FIG. 1. Trailer 100 in backpack form includes a gap space between the parallel half forms that may be covered by backpack material such as 1080-1680-micron nylon/polyester material removed in this instance to illustrate the mechanical apparatus. Trailer 100 includes a telescopic tent support tube frame that includes a pair of tent support base tubes 116 (one per side) connected to frame joint 119 at the opposing ends of the frame joint. Base tubes 116 may accept telescopic tubes 121, which are connected to a tent support handle 114 at both ends of the handle.

In this embodiment, a user may pull out handle 114 to extend the tent support frame out to attain the length required to support a tent structure (not visible) that attaches to the half forms when trailer 100 is extended for use. A user may control the length of the tent support base tube 116 with telescopic portion 126, using a pair of lock collars, 115, adapted to fit over base tubes 116. Collars 115 (one visible) may be rectangular collars or annular collars depending on the tubular form of the tent support frame, without departing from the spirit and scope of the present invention. Tent support frame 116 is used to apply tension to a tent structure over the extended trailer 100, to prevent pets or children from exiting the trailer when it is being towed, or to prevent cargo from falling out of trailer 100 when it is being towed. Trailer tent frame 116 includes spring aided lock pins 118, arranged linearly at the base of the tent support frame 116, for locking the position and extended length of the tent frame. In a preferred embodiment, the tent structure is attached to the half forms and to the underneath of pull out handle 114.

In a preferred embodiment, the telescopic portion, 126, may be extended and locked to an appropriate length for rendering the tent structure taut at the desired tension with respect to the two half forms of trailer 100. In a preferred embodiment, tent support frame 116 is sufficiently wide and conforms with the perimeter rim of each of the half forms (open sides) of trailer 100, so the tent frame, when collapsed, is not an obstruction to items that may be placed within the backpack form ported by a user. Lock collars 115 (one per side) are connected in a pivotal manner at each side to a pair of side lock arms, 117, which, in turn, are connected in pivotal manner to each of the side frame members, 104, such that when a user expands the backpack form the lock collars travel downward over tent support frame 116, where they may be locked into one of the spring-loaded pins, 118, presented in linear array at both sides.

In this embodiment, the half form supporting pocket 101 also covers collapsed wheels, which are extendable to support that half form as a trailer bed, when trailer 100 is in use. The wheels are mounted on brackets, which are mounted to wheel positioning rods, one on each frame member 104. Each wheel bracket may be locked into the extended position via wheel bracket lock arm 120; one lock arm for each wheel bracket. The wheel bracket lock arms 120 are attached to rectangular frame joint 119 at both sides. Lock arms 120 may be fabricated of sheet steel material or another durable metal. In one embodiment, backpack canvas material may be provided for covering any gap that may exist between the opposing rims of the half forms of trailer 100 when collapsed into backpack form. Such materials may be removable from the backpack form along with pocket 101 when the form is extended out for use as a trailer. In this embodiment, telescopic tow bar 112 may be recessed into the padding of material 113, (padded back of half form) and is axle-pinned at the top end of the half form and is supported by end cap 106b to pivot out and be telescoped further out to attain a length required to hitch trailer 100 via tow bar, 112, to a vehicle that will be used to tow it.

Figure 4:
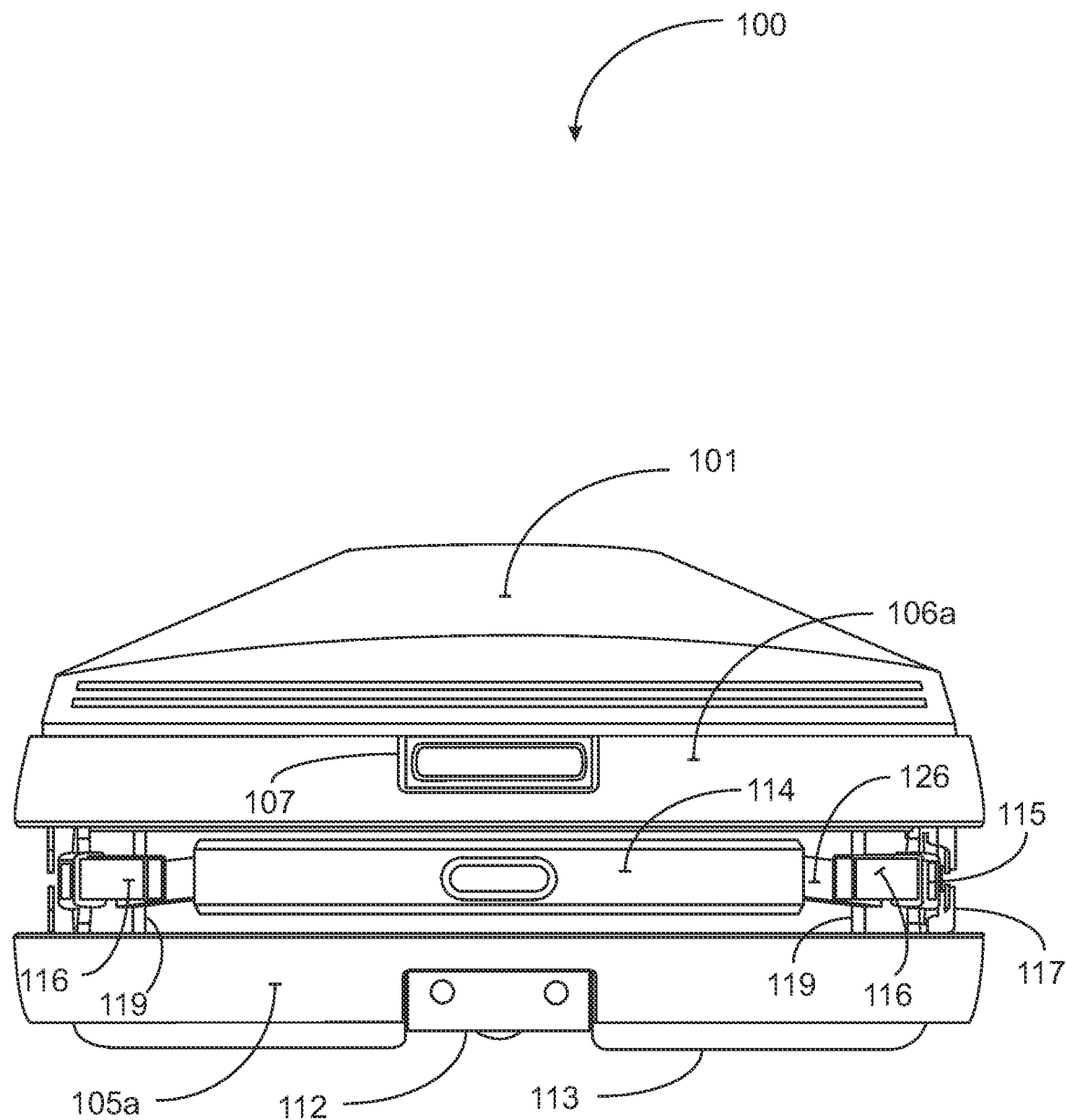
FIG. 4 is a top end view of the collapsible trailer of FIG. 1.

FIG. 4 is a top end view of collapsible trailer 100 of FIG. 1. In this view, trailer 100 is depicted in end view to highlight the top end of the backpack form that opens up to form the extended trailer. The half form supporting pocket 101 and LED light 107 becomes the trailer bed of trailer 100. Pocket form 101 may be removed by a user during the process of extending the backpack form out to a trailer form in order to access the expandable wheels of trailer 100. End cap 106a presents at the rear of the trailer bed in extended form with LED 107 providing a safety light so that the trailer is readily visible in low light conditions. End cap 106a serves as a bumper device for the rear of trailer 100 in extended form. The remaining half form supporting telescopic tow bar 112 assumes an acute angle of up to 90 degrees from the horizontal plane of the trailer bed when being towed. Telescopic tow bar 112 is a straight tow bar and may be extended telescopically from the pivot axle to the rear of a vehicle such as a bicycle, for example, for hitching the trailer. In one embodiment, a hitch apparatus may be provided and installed at the rear and center of a particular vehicle that may be used to tow trailer 100. In an embodiment wherein the towing vehicle is a bicycle, the hitch apparatus may reside at the end of telescopic tow bar and hitches to the bicycle seat post.

The top end of the backpack form of trailer 100 includes tent support handle 114, that may be urged out by a user extending the tent support frame, more particularly base tubes 116 and telescopic tubes 126. In one embodiment, material comprising the tent structure may be collapsed on itself or otherwise folded and may be subsequently stowed within the backpack form; then may be attached and tensioned after the backpack form is extended to trailer form. In another embodiment, the tent structure remains attached to the half forms of trailer 100 while it is in backpack form serving as a fabric liner for the inside of the backpack form. End cap 105a faces the vehicle and may also serve as a protective bumper. Rectangular joint frame 119 is disposed to the rear and serves as the pivoting end of the backpack form enabling the form to be expanded out as the trailer form. Side lock arms 117 are depicted on one side in this end view but are removed for clarity on the opposite side to illustrate the lock arm seats on frame members 104.

Figure 5:
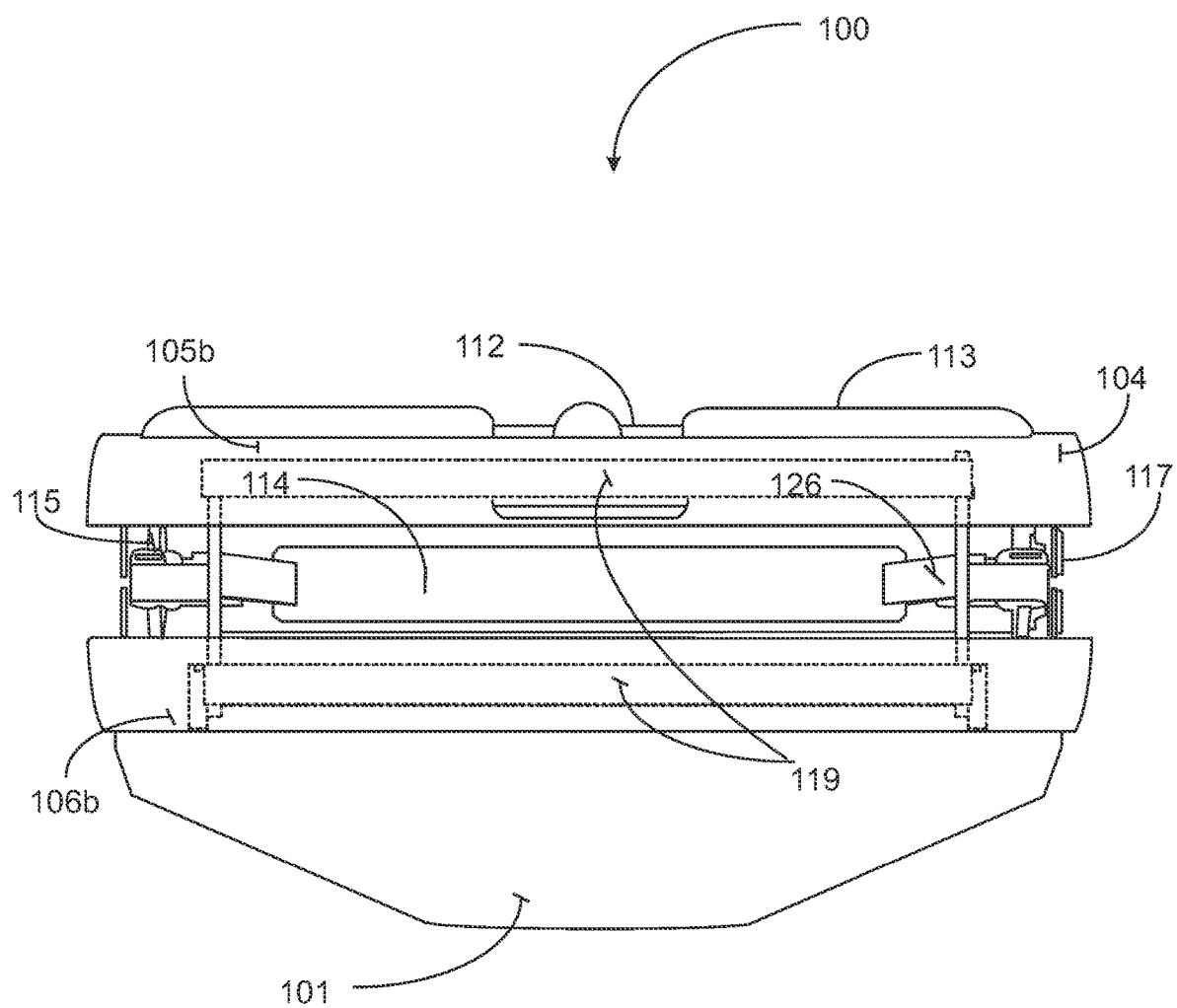
FIG. 5 is a bottom end view of the collapsible trailer of FIG. 1.

FIG. 5 is a bottom end view of collapsible trailer 100 of FIG. 1. Trailer 100 is depicted in backpack form to illustrate the opposite end of the backpack form depicted in FIG. 4. This end of the backpack form is the connected pivoting end of the backpack form. Rectangular frame joint 119 is depicted in broken boundary covered by end caps 106b and 105b. The half form supporting end cap 106b and pocket form 101 becomes the trailer bed for trailer 100 when the backpack form is opened and locked into the trailer form. A user may first unlock the backpack form allowing the half forms to be urged out along the pivot axles formed in rectangular frame joint 119 and may lock the trailer in trailer form using side lock arms 117. Tow bar 112 may be urged out from the seat on its pivot axle to connect trailer 100 to the rear of a vehicle. The underside of pullout tent support handle 114 is visible in this view through the center gap in the parallel frame architecture. In normal practice, backpack material may be provided and attached to the backpack end caps to cover the gap in the frame structure. In one embodiment, the material comprises of flaps that may be zipped together around the perimeter of the backpack form to cover the gap between the folded frame architecture without departing from the spirit and scope of the present invention.

Figure 6:
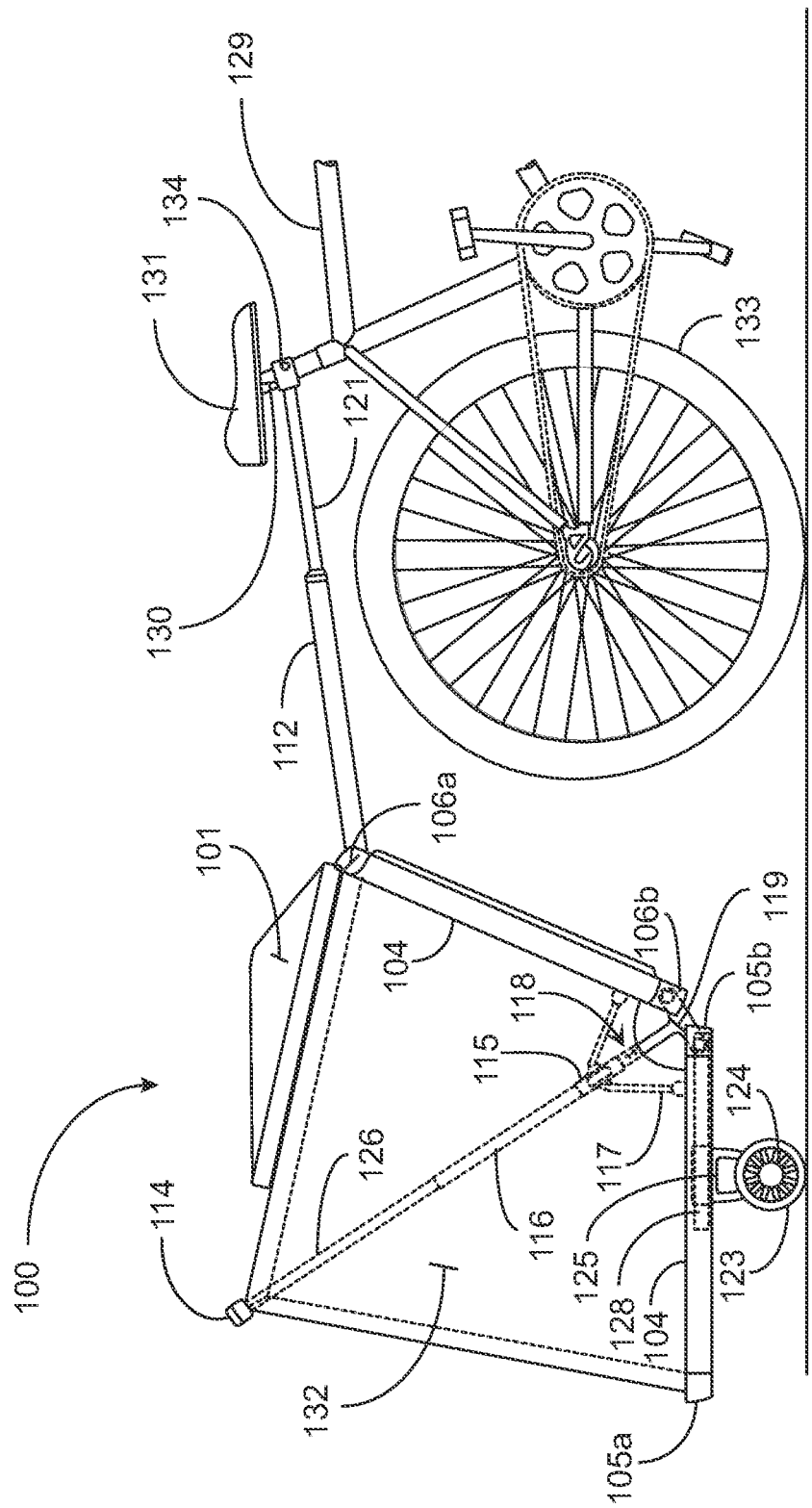
FIG. 6 is a side elevation view of the collapsible trailer of FIG. 1 expanded for use and towed by a bicycle according to an embodiment of the present invention.

FIG. 6 is a side elevation view of collapsible trailer 100 of FIG. 1 expanded for use and towed by a bicycle according to an embodiment of the present invention. Trailer 100 is depicted in this embodiment locked into trailer form and connected to the rear of a vehicle, in this case, a bicycle, 129. In open configuration, trailer 100 has the extra soft good pocket form 101 depicted and described above removed to enable wheels 123 to be expanded out from the bottom padded floor of the half form. In this embodiment, half form 101 may be attached to end cap 106a via hinge or other hardware and be used to provide shade and protection from rain for towed pets, children, or cargo.

The collapsible trailer wheels, 123, may be rubber tires mounted onto a rim connected by spokes to wheel hubs, 124, similar to a small diameter bicycle tire. Wheels, 123 may be about four inches or so in diameter but may be larger in diameter without departing from the spirit and scope of the present invention. In this embodiment, wheel hubs 124 are mounted to the end of steel wheel brackets, 125, that are in turn mounted in pivotal fashion to parallel wheel rods 128, (broken boundaries), supported by frame joint 119 and extending longitudinally through and supported by frame members 104. Material may be removed along the inner side walls of frame members 104 to enable the wheel brackets room to be collapsed into the recesses provided in the padded floor of the trailer bed half form.

In one embodiment, wheel rods 128 are fixed rods and brackets 125 are mounted over rods 128 and enabled to pivot at 90 degrees at the same length on both sides. The mounting location may be enforced by stops placed on each end of the bracket tubes to keep the wheels aligned in the same positions on the wheel rods. In a variation to this embodiment, there may be some forward and rearward position adjustability for wheels 123, provided the adjustment of position is equal on both sides of trailer 100. In the preferred embodiment, the half form supporting the telescopic tow bar 112, with extended telescopic portion 121, is locked at an angled position relative to the horizontally presenting trailer bed half form supporting the wheels, 123. Tent support frame 116 is attached at both sides to frame joint 119 and is depicted as extended out (base tube frame 116, telescopic frame portion 126) to provide tension at both sides of the apex of a tent structure, 132. In a preferred embodiment, tent structure is attached to the half forms and to the underside of pull handle 114 such that pulling out the tent support frame pops up tent structure 132.

Tent support frame 116 with telescopic frame portion 126 assumes a central angle between the extended half forms of about 45 degrees from horizontal. The exact angle of the tent support structure relative to the horizontal plane of the trailer bed half form may depend in part upon whether the half form supporting the tow bar is allowed to extend past vertical or 90 degrees, as is illustrated in this embodiment. In this embodiment, side lock arms 117 and spring-loaded pins 118 enable the user to lock the tent support frame and frame joint into a rigid frame for supporting function as a trailer form and at the appropriate telescopic length for supporting a canvas tent structure, 132. Tent structure 132 may be a three-dimensional semi-rigid tent that functions like a pop out structure that holds form as long as the apex is supported by the tent support frame. Tent structure 132 may already be attached to the half forms of trailer 100 during the backpack form and may be popped out with the aid of tent support frame 116 when the trailer form is being configured and locked into form. Tent structure 132 may, in one embodiment, be a separate accessory that a user may attach to the half forms of the trailer at will, if the user deems it required to secure cargo or a pet in the trailer bed. The tent structure 132 might be snapped onto the half forms of trailer 100 or otherwise removably affixed thereto.

Tent form 132 is a three-dimensional structure that may include typical tent material features that are not illustrated here. These tent features might include window flaps and screens on the sides, front, and rear for aeration. A zippered opening might be provided at the rear, similar to a tent door, for opening to allow for loading the pet trailer with cargo or a pet and removing the same while trailer 100 is active and tent structure 132 is in place and is taut. In one embodiment, a second set of spring-loaded pins might be provided and dedicated solely to setting the length of the tent support frame, more particularly, the telescopic frame tube 126. While there may be an upper limit to the amount of square footage available in the trailer bed half form for storing cargo and a pet, in the backpack form embodiment, that limit may be up to six square feet depending on the overall dimensioning of the backpack form. For example, a smaller backpack form may be provided for children while a larger and more robust backpack form might be provided for adults. It is duly noted herein that trailer 100 may also be collapsed into a luggage form or even a briefcase form instead of a backpack form without departing from the spirit and scope of the present invention. In a variation of the embodiment using a luggage form, the luggage form may be pulled on extended wheels by the tow bar extended to pull or tow while the half forms are still closed and containing luggage. There are many design variances that may be observed without limiting the scope of the present invention.

In another embodiment, trailer 100 is mounted to bicycle 129, at a bicycle seat post 130, supporting a bicycle seat, 131. The adjustable telescopic length of tow bar 112 with telescopic portion 121 enables trailer 100 to be placed far enough to the rear that it does not interfere with the bicycle rear tire 133. In this embodiment, a hitch collar 134 is provided at the end of telescopic rod 121 and secures the trailer about seat post 130. In other embodiments where trailer 100 may be towed behind a three-wheeled or four wheeled vehicle, there may be provided a trailer bar or tow bar hitch for hitching and unhitching trailer 100. Further, such a hitch may also be enabled to swivel in one embodiment to make turning while the trailer is being towed easier.

Figure 7:
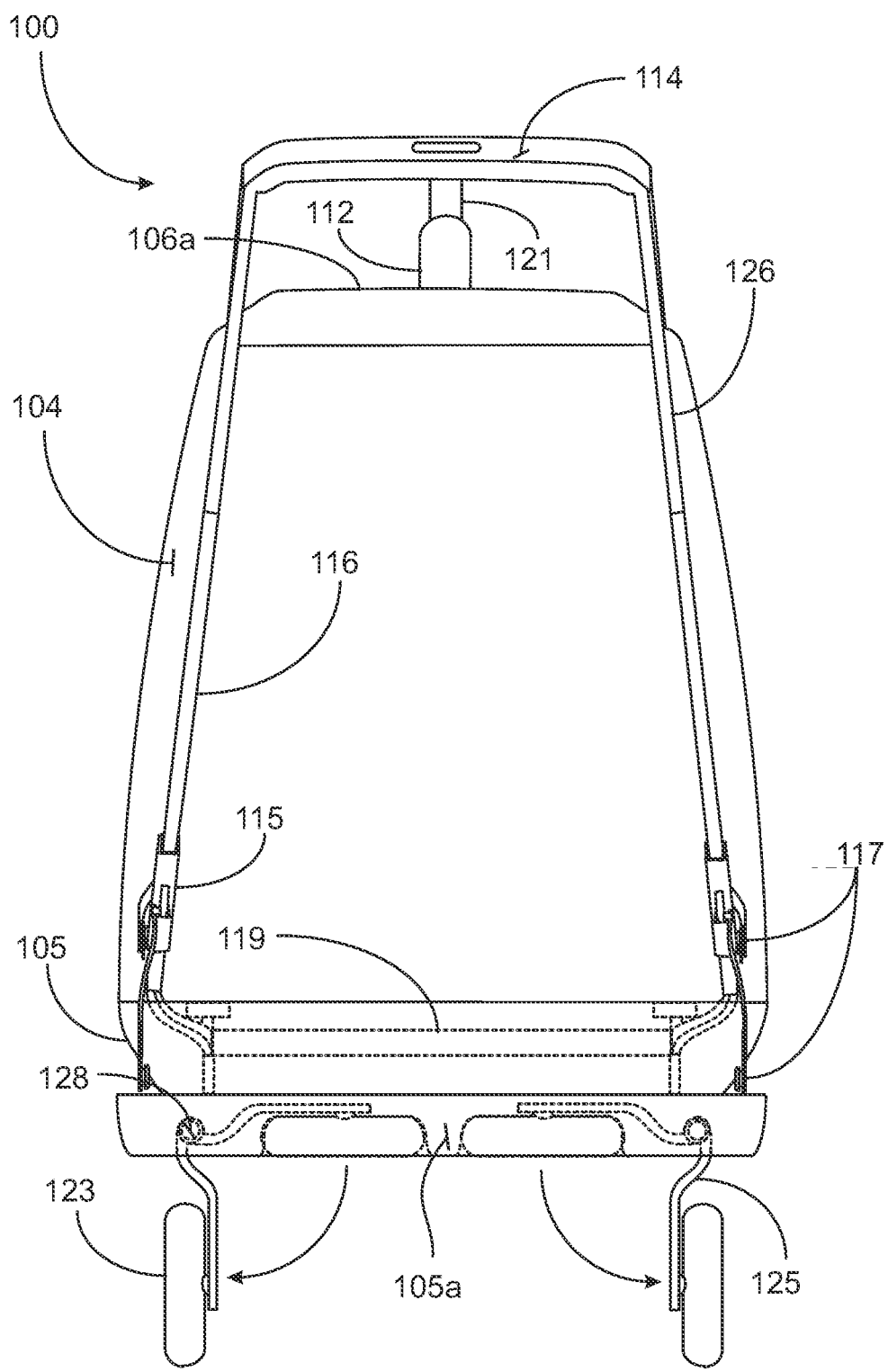
FIG. 7 is a rear-end view of the collapsible trailer of FIG. 1 expanded for use as a towed trailer.

FIG. 7 is a rear-end view of collapsible trailer 100 of FIG. 1 as it is expanded for use as a towed trailer. Trailer 100 is depicted from a rear view perspective, behind the trailer being towed. In this view, the rear LED, 107, is removed for the purpose of clarity and wheels 123 are in expanded position for use. Brackets 125 may be urged inward about wheel rods 128 when collapsing them into wheel seats or annular recesses formed or molded into the padded floor of the trailer bed half form of trailer 100. In this view, the collapsed state is depicted in broken boundary behind end cap 105a. In a preferred embodiment, wheels 123 may be locked in a vertically extended position for trailer towing via locking wheel rod position, or by locking the 90-degree pivot position of bracket 123 over the wheel rod 128. In one embodiment, wheels 123 may also be locked into a recessed or collapsed position using a wheel rod locking mechanism or a local mechanism to the bracket and rod interface. In one embodiment, the seats formed in the trailer for accepting wheels 123 in collapsed state have a locking mechanism to keep the wheels recessed in the seats. In a variation of this embodiment, a retainer strap of material may be provided to secure over the recessed wheels by snap and snap recess, or by hook and loop. In yet another embodiment, wheels 123 have a diameter similar or slightly larger than the recesses and may be pressed into collapsed state and pulled back out using moderate force.

In this embodiment, two pairs of side lock arms 122 are depicted that are connected to the lock sliders, 115, at each side, to lock the position of tent support frame 116. Telescopic portion 126 of support frame 116 is urged out by pulling tent support handle 114 and may be locked to desired length. Tent structure 132 is removed from this view for clarity but may be assumed present in this example. In this view, tow bar 112 including telescopic portion 121, is at front of trailer 100 extended out to attach to a vehicle, such as a bicycle, 129, depicted in FIG. 6. In general use, the tent structure 132, FIG. 6, may install to the half forms and over the top of tent support frame 116 such that a user may unlock the telescopic portion, 126 and pull it out while the tent material is attached, to further increase the tension of the tent structure. Tent flaps, tent openings, screen windows, and, in one embodiment, a rain tarp provided and adapted to be attached over the tent structure to shield the material and cargo or pet within from rain. In one embodiment, the tent structure may include pockets sewn onto or otherwise formed on the inside walls of the three-dimensional structure to store items and thin materials like office papers and a laptop computing appliance or accessory electronics that may be routinely carried in the backpack form. Another embodiment provides pockets and/or sleeves within half form 101 to hold said items.

FIG. 8A-C is an overhead exploded view of the basic components of collapsible trailer of FIG. 1, expanded for use. Referring now to FIG. 8B, trailer 100 is depicted in frame without soft materials including padded panels, the tent structure, and protective end caps. In this overhead view, the half form of trailer 100 in expanded trailer form that may be connected to a vehicle using tow bar 112, is angled upward relative to the horizontal trailer bed formed by the remaining half form. In addition to the end caps, steel or metallic filler plates 127 may be provided to isolate frame components and to provide structural integrity to the overall frame of trailer 100 that includes side frame members 104 and frame joint 119. Referring now to FIG. 8C, end caps 106a and 106b are depicted removed, along with padded material 113. Padded material 113 forms the back side of the half form that faces the vehicle when trailer 100 is towed. In a preferred embodiment, padded material 113 may be secured into frame components like side tube members 104 to form the floors of each half form. Padded material 113 may be a stiff molded material or a polymer panel covered with the padded material. Padded material may be a synthetic microfiber material such as 1080-1680 nylon/polyester.

Referring now back to FIG. 8B, tent support frame 116 with telescopic portion 126 culminating at tent support handle 114, is positioned to support a three-dimensional tent structure. Rubber wheels 123 are visible on wheel rods 128, beneath tubular side frame members 104 at each side. Referring now to FIG. 8A, padded material 113, end caps 105a and 105b, and LED 107 are removed from the trailer half form that forms the trailer bed in the extended configuration of the backpack form of trailer 100. In one embodiment of the present invention, material 113 is a stiff and resilient material having side forms at the interfacing edges to the side frame members 104, that may fit into a reciprocal form or groove provided for the purpose in extruded side frame members, 104. The stainless-steel fillers, frame joint 119, and other hardware aids in closing the spacing between the side frame members to keep the material, 113, taut.

FIG. 9 is a process flow chart depicting steps, 900, for expanding trailer 100 from a backpack form into a trailer form. It is assumed in this process that a user is wearing trailer 100 as a backpack form. In a use case scenario, a user may be walking a small pet on a leash while wearing trailer 100 as a backpack form to a first location, where the user has a vehicle like a bicycle stationed for use. At step 901, having arrived at their location, the user may remove the backpack form from a wearable position, remove items stored in the pack and pockets, and may unlock the frame joint of the backpack form. In one aspect, the frame joint may be locked by a tumbler lock mechanism requiring the user to align numbers on the tumblers to clear the lock mechanism. In another aspect, a different lock mechanism might be provided to lock the half forms of the trailer into closed position. In an alternate embodiment, the user may be required to unzip the material over the backpack frame to reveal the locking and unlocking mechanisms.

At step 902, the user may pull out the tent support frame while at the same time opening the backpack form by pulling apart the half forms connected to the frame joint at the pivot axles. It is assumed in this step that a tent structure is attached to the half forms and tent support frame and secured at apex to the underside of pull out handle 114. At step 903, the user may lock the trailer forms into expanded position using a pair of lock collars over the base tubes of the tent support frame to lock the side lock arms attached to the lock collar and to each of the half forms at both sides of the trailer form. In this step, the user may also lock in the overall telescopic length of the tent support frame, including the length of the base tubes plus the length of the telescopic tubes connected to the pull-out handle. In a preferred aspect, the angle of the trailer half forms, and the overall length of the tent support frame are locked simultaneously by the positions of the lock collars over spring-loaded lock pins.

At step 904, the user may remove the exterior pocket form from the trailer bed portion of the trailer to expose the recessed trailer wheels. Also in this step, the user may use the exterior pocket form over the top of the tent structure for shade or protection from weather. The user may unzip the exterior pocket or may unsnap the exterior pocket or may unhook (hook and loop) the pocket. At step 905, the user may pull each of the recessed trailer wheels out from the recessed positions, pivoting each wheel over the hosting wheel rod to vertical position for use. At step 906, the user may lock the wheels into vertical position using standard lock hardware. In one aspect, the wheel brackets self-lock onto the wheel rod in vertical position and the user must depress a lock pin to unlock the brackets when configuring back into the backpack form of the trailer.

At step 907, the user may pull or otherwise urge the telescopic tow bar out from a vertical recess and extend the bar telescopically to a desired length for towing. At step 908, the user may lock in the length of the tow bar by pin locking the telescopic tube to the base tube of the tow bar. At step 909, the user may hitch the tow bar to the vehicle, in this case a bicycle. At step 910, the user may place the pet and items that were stowed in the backpack form into the trailer bed through a zippered or snap-seam opening on the tent structure provided for the purpose. In one aspect, the tent structure includes one or more zippered pockets for holding a laptop or other thin electronic appliances and office papers, etc. that may have been stowed in the backpack form. At step 911, the user may begin towing the trailer behind the vehicle. Converting the trailer form back into a backpack form may essentially be a reversed process.

It will be apparent with skill in the art that the collapsible trailer system of the present invention may be provided using some or using all the elements described herein. The arrangement of elements and functionality of the invention is described in different embodiments, each of which is considered an implementation of the present invention. While the uses and methods are described in enabling detail herein, it is to be noted that many alterations could be made in details of the construction and the arrangement of the elements without departing from the spirit and scope of this invention. The present invention is limited only by the breadth of the claims below.

The invention claimed is:
1. A trailer apparatus comprising:
a first half form adapted as a trailer bed having a floor and a solid frame perimeter defining an internal volume, the first half form open on one side;
a second half form having a floor and a solid frame perimeter defining an internal volume the second half form open on one side;
a frame joint having a first pivot bar and a second pivot bar, the pivot bars held spaced apart and fixed in parallel relationship by framing elements, the first half form mounted to pivot at one end over the first pivot bar, the second half form mounted to pivot at a like end over the second pivot bar on the frame joint, producing a clam shell arrangement between the first and second half forms;

a first pair of locking mechanisms for locking the half forms in a closed and parallel position with the open sides of the half forms facing each other, doubling the internal volume defined within each half form for use as a secure storage apparatus for storing items within at least the internal volume of both half forms in closed position;

a telescopic support frame having a base tubular portion and a telescopic portion thereof positioned within the tubular base portion, the telescopic portion thereof culminating at a pullout handle, the telescopic support frame positioned between the first and second half forms and connected to the first half form solid frame at one side and the second half form solid frame at the other side by a pair of sliding frame lock mechanisms;

a pair of trailer wheels bracketed and mounted to pivot over a pair of wheel rods, the wheel rods mounted at one end to the frame joint on each side of the frame joint, the wheel rods spaced apart and held parallel at each side of the solid frame perimeter of the first half form, the wheels enabled to collapse into recesses in the floor of the first half form; and a telescopic tow bar having a base tubular member and a telescopic tubular member set within the base tubular member, the tow bar mounted to pivot out from a recessed position in the floor of the second half form and be telescoped out further in length to connect the trailer apparatus to a vehicle.

2. The trailer apparatus of claim 1, wherein the half forms are closed to form a wearable backpack.

3. The trailer apparatus of claim 1, wherein the towing vehicle is a bicycle.

4. The trailer apparatus of claim 1, wherein the towing vehicle is a vehicle with at least three wheels.

5. The trailer apparatus of claim 1, wherein the floors of the first and second half forms are padded with a stiff moldable material.

6. The trailer apparatus of claim 1, wherein the solid frame perimeter of each half form includes extruded aluminum tubular frame members at each side, held parallel and spaced apart by molded polymer-based material end caps that serve as protective bumpers, isolate frame components from the internal volume space of the half forms and serve as mounting support for accessories.

7. The trailer apparatus of claim 1, wherein the telescopic support frame and telescopic tow bar are fabricated of aluminum.

8. The trailer apparatus of claim 1, wherein the tow bar is connected to a swivel hitch provided on the rear center portion of the vehicle.

9. The trailer apparatus of claim 1, wherein the half forms are closed to form a piece of hand-carried luggage.

10. The trailer apparatus of claim 9, wherein the half forms are closed and the wheels extended in the form of a piece of luggage translated on wheels.

11. The trailer apparatus of claim 1, wherein the half forms are opened and the wheels extended from the recesses to form a towable trailer.

12. The trailer apparatus of claim 11, wherein the pair of sliding lock mechanisms on the support frame lock the support frame and the first and second half forms into an open state for trailer use.

13. The trailer apparatus of claim 1, further including a tent structure attached at the base thereof to the open sides of the half forms, the tent structure held taut by the telescopic support frame.

14. The trailer apparatus of claim 13, wherein the tent structure includes at least one pocket on an inside wall for stowing a laptop, thin electronic device, and office papers.

15. The trailer apparatus of claim 13, wherein the tent structure includes tent flaps, windows, and at least one closeable tent opening for loading and unloading pets, children, and cargo.

16. The trailer apparatus of claim 13, wherein the tent structure remains connected to the half forms in closed position serving as a canvas liner on the inside of the closed form of the trailer apparatus and pops out as a three-dimensional tent structure when the trailer apparatus is opened and locked into trailer form.

17. The trailer apparatus of claim 1, further including an external pocket form removably attached to the floor of the first half form over the wheel recesses, the external pocket form providing additional volume for storing items in the closed form of the trailer apparatus.

18. The trailer apparatus of claim 17, wherein the external pocket form may be removed by unzipping the form from the external surface of the first half form.

* * * * *